INVENTOR.
MELVIN H. BROWN

United States Patent Office 3,597,329
Patented Aug. 3, 1971

3,597,329
THIN FALLING FILM, WATER FLASHING DISTILLATION SYSTEM
Melvin H. Brown, Leechburg, Pa., assignor to Aluminum Company of America, Pittsburgh, Pa.
Filed Mar. 7, 1969, Ser. No. 805,229
Int. Cl. B01d 3/06
U.S. Cl. 203—11                      7 Claims

ABSTRACT OF THE DISCLOSURE

A liquid such as water enters a chamber maintained at a pressure below its saturation pressure so that a portion of the feed liquid is flash evaporated and a portion discharged at a reduced temperature. The evaporation is effected by distributing the feed liquid over a plurality of parallel, closely spaced and substantially vertical surfaces upon which the liquid flows downwardly in falling film-wise manner. Vapor is formed in the spaces between the vertical surfaces and is removed in a direction substantially transverse to the downward falling film flow. The vapor so produced exhibits a very low entrainment level.

BACKGROUND OF THE INVENTION

Flash evaporators have been employed in various applications including those where water is evaporated. In flash evaporation, the entering feed liquid is exposed to a pressure below its saturation pressure. This prompts a portion of the liquid to evaporate to produce a vapor. The heat of vaporization which is removed from the remaining liquid imparts to the unevaporated liquid portion a reduced temperature. One problem prevalent in such applications is the amount of liquid entrainment in the exiting vapor. Various solutions to the problem include demisters which include chevrons, screens and packing filled passages. Demisters have provided varying degrees of success in lowering the liquid entrainment of the exiting vapor but are marked by disadvantages in that the exiting vapor still contains a substantial amount of liquid entrainment and the pressure drop associated with the most effective demisters is sometimes substantial.

In accordance with the invention, the amount of mist formation at the evaporation site is kept to a minimum and there is some degree of mist removal effected at the evaporation site. This provides a markedly mist-free vapor which, if desired, can be passed through the normal types of demisters although in many applications such demisters will be found unnecessary.

In accordance with the invention, the evaporation is effected by distributing the feed liquid onto a plurality of opposite facing substantially parallel and substantially vertical surfaces. Between neighboring oppositely facing surfaces there is established a vapor zone for evaporation and vapor removal. The feed liquid flows downwardly on the vertical surfaces in falling film fashion and a portion thereof evaporates to produce a vapor. The vapor is removed through the zones between the adjacent surfaces in a direction substantially transverse to the downward falling film flow of the feed liquid. The oppositely facing surfaces are closely spaced, not more than two inches apart, and may be provided by a plurality of vertical flat sheet members with the feed liquid film falling down both sides of each sheet.

In this description, reference is made to the drawings in which.

Figure 1:
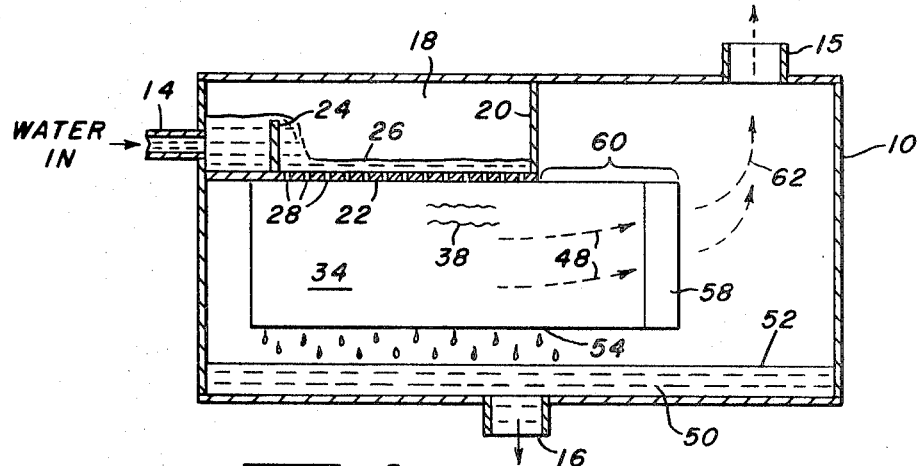
FIG. 1 is an elevation view illustrating an embodiment of the invention.
Figure 2:
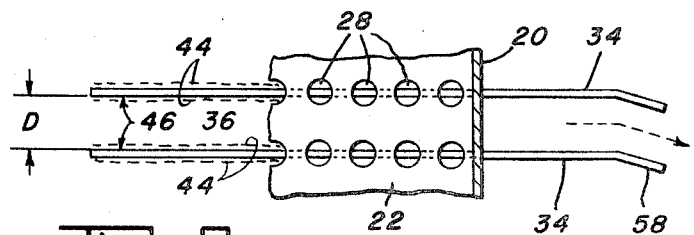
FIG. 2 is a partial plan view illustrating in more detail a portion of the embodiment shown in FIG. 1.

Referring to FIGS. 1 and 2, evaporator chamber 10 is provided with a feed liquid inlet 14 and an outlet 16 for the unevaporated portion of the feed liquid together with a vapor outlet 15. As the feed liquid enters the evaporator, it is first introduced to a first chamber 18 within the evaporator. The chamber is separated from the balance of the evaporator by vertical end wall 20 and horizontal plate 22. The feed liquid is distributed transverse to the plane of the drawing by weir 24 and the weir overflow distributed across the remainder of plate 22 in the form of a relatively shallow pool 26. Plate 22 is provided with a plurality of perforations 28 arranged in a plurality of substantially straight rows. Beneath these perforations and coincident with the perforation rows are a plurality of evaporator sheets 34. These sheets are substantially flat and are disposed in a substantially vertical fashion. The sheets are substantially parallel and are closely spaced, the distance D separating neighboring sheets generally being not more than two inches. Between neighboring sheets there is established vapor zones 36 in which vapor is formed and through which the vapor is continuously removed.

The feed liquid distributed in pool 26 above the perforated plate 22 flows downwardly through the perforations and is spread over both sides of each of the evaporative sheets 34. This produces a downward falling film flow 38 on each side of the sheets 34. Thus, referring to FIG. 2, there is a falling feed liquid film 44 on each of opposing parallel surfaces 46 provided by neighboring sheets 34. It is essential that the feed liquid be smoothly spread upon the surfaces 46 in a manner which substantially avoids forming liquid particles or drops. Thus, sprays or other forms of liquid distribution which form drops or turbulence are preferably avoided. The perforated plate 22 represents a highly convenient manner of spreading the feed liquid without excessive turbulence and without forming liquid drops.

As the liquid flows downwardly in film-wise fashion over the surfaces 46, a portion flashes to form a vapor in the vapor zones 36 established in the spaces between neighboring sheets. Flashing is effected by maintaining in the vapor zones a pressure lower than the saturation pressure of the liquid. Rather than permit vapor to flow upwardly or countercurrently to the downward falling liquid film, it is removed by moving it in a direction substantially transverse to the downward liquid flow. That is, referring to FIG. 1, the vapor is removed in a substantially horizontal direction as shown by dotted arrows 48.

The unevaporated portion of the feed liquid passes from the bottom of sheets 34 and is collected as a body of liquid 50 which is continuously removed through liquid outlet 16. The surface 52 of this liquid is preferably maintained at a level at least one inch below the bottom edge 54 of the vertical sheets 34. By so maintaining the level of the unevaporated liquid, foaming is almost completely eliminated and entrainment is further reduced. This effect becomes more significant as the evaporation rate is increased.

Figure 3:
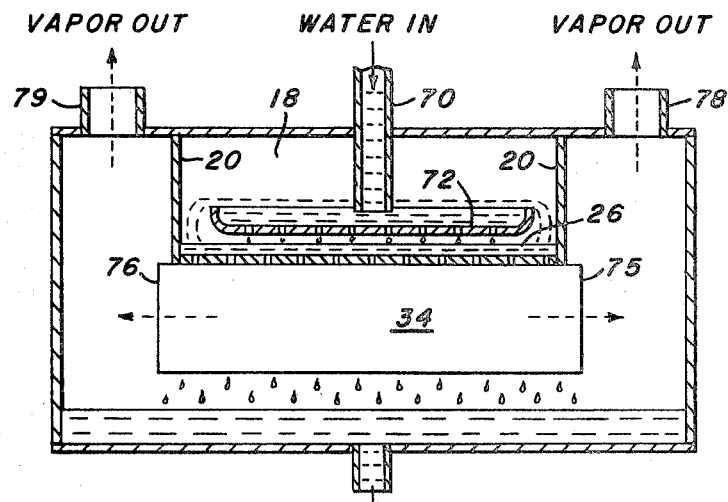
FIG. 3 is an elevation illustrating a second embodiment of the invention.

Referring to FIG. 3, an additional embodiment is shown featuring a central downcomer 70 for the feed liquid inlet. The incoming feed is spread across a first distribution dish 72 equipped with rows of perforations together with a provision for overflow so as to effect a relatively uniform distribution to liquid pool 26 above distribution plate 22. Distribution plate 22 is provided with similar perforations as described in connection with the FIG. 1 embodiment. The liquid flows down evaporation sheets 34 and is partially evaporated in the spaces between neighboring sheets 34. In this embodiment, the vapor is caused to move towards both vertical edges 75 and 76 of the evaporation sheets. Both vapor streams can join to exit through a common vapor outlet, not shown, or separate outlets 78 and 79 can be employed.

The spacing D between the opposite facing surfaces 46 of neighboring sheets in either FIG. 1 or FIG. 3 should not be more than two inches and is preferably not more than 1½ inches. For instance, in the flash evaporation of sea water to recover purified vapor condensate, a spacing of approximately one inch has produced very good results in lowering liquid entrainment in the vapor exiting a flash evaporator.

The size and spacing of the perforations in distribution plate 22 can vary somewhat. Referring again to the flash evaporation of sea water, a one-inch spacing of ½ inch diameter perforations has proved highly satisfactory.

In speaking of removing the vapor by moving it in a direction substantially transverse to the downward falling film flow, it is not intended that such be constructed in an extremely narrow sense. There may be some minor upward or downward aspect to the flow; however, it must exhibit a highly predominant horizontal characteristic. It is believed that the use of closely spaced falling liquid films together with the transverse removal of the vapor combine to markedly reduce the amount of mist entrainment in the vapor even where the evaporation rate is very rapid.

In addition to removing the vapor in a direction substantially transverse to the liquid flow, it is also helpful in minimizing entrainment if the predominant vapor flow direction be changed just after leaving the vapor zones 36 beneath plate 22 but before deviating from transverse movement with respect to the falling liquid film. Referring to FIGS. 1 and 2, this can be accomplished by bends 58 on a portion of the vertical evaporative sheets 34 which extend laterally beyond the downwardly flowing liquid film 38 and hence laterally beyond the portion of vapor zones 36 where evaporation occurs. That is, a portion 60 of sheet 34 extends beyond the lateral boundary of the vertical falling film and in this portion bends 58 serve to deflect the vapor flow while still maintaining its movement to the vertical falling film. An additional but less controlled change in flow inherently occurs as indicated by the arrow 62. While this later change in direction is often helpful to a small degree, the direction change associated with the bends 58, that is, the change while vapor flow is still substantially transverse to the vertical falling liquid film, is often quite beneficial in minimizing entrainment.

The size of the evaporative sheets and the associated evaporative surfaces provided thereby can vary considerably although it is preferred that the vertical dimension be kept under two feet and preferably not over 18 inches.

The lateral (horizontal) extension of the sheets and the surfaces provided thereby are quite significant. It is advisable that the horizontal extension be at least two times the vertical dimension and preferably at least three times that value although it is also preferred that it not exceed 100 inches. In addition, it is advisable that the horizontal extension be at least 15 times, and preferably at least 25 times, the distance between opposite surfaces, distance D in FIG. 2. While reference herein is made to sheets, such is not intended to be narrowly construed. Obviously, relatively thick members, for instance ¼ or ½ inch thick, can function as sheets 34 although such would require more space and would result in a weight increase.

The following examples illustrate the practice and benefits of the invention.

Example 1

A horizontal cylindrical evaporator was constructed having a shell of 3½ feet diameter and a horizontal length of 7 feet. Runs were conducted at various water condensate production rates for various evaporation conditions and the amount of liquid entrainment in the vapor was measured. The evaporation conditions were as follows:

(A) Empty shell.—The incoming water stream enters above a liquid pool on the bottom of the evaporator. The stream falls upon the pool and causes some splashing.

(B) Open pool.—The incoming water stream flows under the surface of the pool to avoid the splashing of condition (A).

(C) Open pool with demister.—A 2 x 1 inch diamond demister is provided at the vapor outlet of the condition (B) arrangement.

(D) Dispersion tray and baffles.—A perforated dispersion tray spreads the incoming water and allows it to pass through 65 holes ¼ inch diameter; baffles cause two substantial (almost 180°) changes in vapor flow direction.

(E) Dispersion tray, baffles and demister.—Same as condition (D) except for the addition of a 2 x 1 inch diamond mesh demister.

(F) Dispersion tray and vertical sheets.—Thirty-one parallel sheets 0.064 inch in thickness, 48 inches long by 12 inches high were disposed beneath 31 rows, spaced by 1 inch, of ½ inch diameter holes on 1 inch centers. The arrangement is the same as shown in FIG. 1.

(G) Dispersion tray, vertical sheets and demister.—A 2 x 1 inch diamond mesh demister was positioned in the vapor outlet of the condition (F) arrangement.

(H) Dispersion tray, vertical sheets and fly screen demister.—A fly screen demister was positioned in the vapor outlet of the condition (F) arrangement.

The results are listed in Table I for the runs at 6000 gallons per day condensate. This production rate is considered quite representative of the comparative results for the various rates tested. The entrainment values in Table I are expressed in terms of percent by weight of entrainment in the vapor leaving the evaporator.

TABLE I

| Condition: | Entrainment, percent |
|---|---|
| A | 3.5 |
| B | 2 |
| C | 0.5 |
| D | 0.4 |
| E | 0.18 |
| F | 0.02 |
| G | 0.017 |
| H | 0.005 |

From the foregoing, it is quite apparent that conditions (F), (G) and (H), which represent the invention provide markedly improved results in terms of minimum entrainment in comparison to the other conditions. The minimum extent of the improvement is almost tenfold as seen in comparing conditions (F) and (E).

Example 2

The evaporator described in condition F in Example 1 was tested to verify its performance under various temperatures, production rates and other such aspects. By way of further detail, and referring to FIG. 1, the sheets 34, 48 inches long, extended 12 inches beyond vertical baffle 20 which extension included a 3-inch long bent portion 58, in FIG. 2. Several runs were conducted using simulated sea water as the incoming liquid. The results are set forth in Table II where the following are tabulated:

Overall ΔT.—The temperature difference between the evaporator incoming water and the condenser cooling water.

Evaporator ΔT.—The temperature difference between the evaporator incoming and outgoing water streams. (Nozzles 14 and 16 in FIG. 1.)

Total product.—As gallons of condensate per day.

Entrainment.—As weight percent of the vapor.

Feed water rate.—Rate of evaporator feed or incoming water as gallons per minute.

Conversion factor.—Product recovered as weight percent of the incoming or feed water rate.

In addition, the depth of the pool beneath the vertical sheets was varied to demonstrate its effect on entrainment.

From Table II it is very apparent that entrainment levels can consistently be achieved at 0.05% or less at product rates of about 10,000 gallons per day. At higher production rates, it is often advisable to keep the level of the pool below the vertical plates rather than in contact with the plates. It appears that the best combination of production rate, minimum entrainment and maximum feed conversion is realized where the pool is at least one inch below the bottom edge of the vertical sheets.

While, at first glance, the entrainment values for Runs 1 and 2 may appear to compare unfavorably with those set forth in Example 1 for practices outside the invention, it must be remembered that the production rate, 6000 gallons per day in Example 1 is much lower than the 10,000 gallons per day level of Runs 1 and 2 of Table II. When running at 10,000 gallons per day production under conditions (A), (D) and (E) in Example 1, entrainment levels of 40, 4 and 1.6%, respectively, were measured. Conditions (B) and (C) were not measured at 10,000 gallons per day but demonstrated at 8000 gallons per day entrainment levels of over 30% and over 3%, respectively. In this light, the results in Table II for Runs 1 and 2 represent a marked improvement.

TABLE II

| Run Number | Overall, ΔT, °F. | Evaporator, ΔT, °F. | Total product, gal./day | Entrain., percent | Feed water, gal./min. | Conversion factor, percent |
|---|---|---|---|---|---|---|
| Water level 1 inch above bottom edge of plates | | | | | | |
| 1 | 41.5 | 16.5 | 9,938 | 0.25 | 434 | 1.59 |
| 2 | 42 | 16.5 | 10,548 | 0.37 | 460 | 1.59 |
| 3 | 27.5 | 12.5 | 7,206 | 0.04 | 417 | 1.20 |
| 4 | 24 | 10 | 5,526 | 0.02 | 400 | 0.96 |
| 5 | 20 | 9 | 5,334 | 0.03 | 428 | 0.86 |
| 6 | 16 | 7.5 | 4,548 | 0.02 | 438 | 0.72 |
| 7 | 10 | 4 | 2,432 | 0.01 | 440 | 0.38 |
| Water level even with bottom edge of plates | | | | | | |
| 8 | 44.5 | 19.5 | 9,878 | 0.05 | 367 | 1.87 |
| 9 | 40.5 | 18 | 9,565 | 0.04 | 385 | 1.72 |
| 10 | 28 | 13 | 7,118 | 0.03 | 396 | 1.25 |
| 11 | 20.5 | 10 | 5,242 | 0.02 | 380 | 0.96 |
| 12 | 10.5 | 5 | 2,562 | 0.01 | 371 | 0.48 |
| 13 | 15.5 | 7 | 3,966 | 0.01 | 410 | 0.67 |
| Water level 1 inch below bottom edge of plates | | | | | | |
| 14 | 43 | 22 | 8,840 | 0.03 | 291 | 2.11 |
| 15 | 20 | 10 | 4,855 | 0.02 | 352 | 0.96 |
| 16 | 15 | 8 | 3,685 | 0.02 | 334 | 0.75 |
| 17 | 10.5 | 5.5 | 2,492 | 0.01 | 327 | 0.53 |

From the foregoing, it is apparent that the invention offers substantial advantages in flash evaporating water while minimizing liquid entrainment in the vapor exit stream. This renders the improvements set out herein highly useful in the purification of saline or other brackish water by evaporation and condensation, although such is not necessarily intended as a limitation on the practice of the invention which is adapted to the evaporation of other liquids.

What is claimed is:

1. In a method wherein a portion of feed liquid is flash evaporated to produce a vapor and unevaporated liquid portion at a reduced temperature, the steps comprising:
    (1) continuously smoothly spreading substantially all said feed liquid without any substantial formation of liquid particles upon a plurality of oppositely facing substantially vertical and substantially parallel unheated film supporting surfaces, and causing said liquid to flow downward over said surface in falling liquid film-wise fashion, the liquid films and their supporting surfaces being spaced apart, the spaces therebetween being not more than two inches, said surfaces and the spaces therebetween having a horizontal extension of a least 15 times the spacing therebetween, to establish within said spaces a plurality of horizontal elongate vapor zones,
    (2) maintaining the pressure in said vapor zones at a level less than the saturation pressure of said liquid, thereby to cause a portion of said liquid to flash evaporate and produce (a) vapor containing some amount of unevaporated liquid as an entrained mist in said vapor, and (b) remaining unevaporated liquid in said liquid films at a reduced temperature,
    (3) continuously removing said vapor from said vapor zones by causing substantially all of it to move therethrough in a direction parallel to the liquid films but substantially transverse to their downward direction of travel whereby said entrained mist in said vapor is substantially reduced.

2. The method according to claim 1 wherein said vapor just after exiting the evaporaion portion of said vapor zones and while still moving in a direction substantially transverse to that of the downward falling film flow is imparted with a change in direction.

3. The method according to claim 1 wherein the parallel surfaces are spaced by not more than 1½ inches.

4. The method according to claim 1 wherein the feed liquid is brackish water and the evaporation is effected at a pressure less than atmospheric pressure and the vapor produced is condensed and recovered as a purified water product.

5. The method according to claim 1 wherein said parallel surfaces are provided by both sides of a plurality of sheet members.

6. A flash evaporator comprising:
    (1) means defining a plurality of oppositely facing substantially vertical and substantially parallel non-heating surfaces spaced apart, the spaces therebetween being not more than two inches, the surfaces having a horizontal extension at least 15 times the spacing therebetween, said spaces between said surfaces establishing horizontally elongate vapor zones,
    (2) means to smoothly spread substantially all incoming liquid feed upon said surfaces in falling film fashion without any substantial liquid particle formation,
    (3) means for removing vapor formed in said vapor zones between said oppositely facing surfaces in a substantially horizontal direction.

7. A flash evaporator comprising:
    (1) a sealed evaporation chamber having a liquid inlet, an outlet for unevaporated liquid and an outlet for vapor,
    (2) a feed distribution plate for the liquid feed, (3) means to spread incoming feed liquid over the feed distribution plate, (4) a plurality of perforations through said distribution plate, the perforations being arranged in a plurality of closely spaced and substantially straight rows, (5) a plurality of thin, closely spaced, substantially vertical and parallel non-heating sheet-like members disposed in abutment with the lower surfaces of said distribution plate and aligned with the perforations along the rows thereof, the sheet members and associated perforation rows being arranged such that the surfaces of the sheet members are spaced apart, the spaces therebetween being not more than two inches, the horizontal extension of said sheets being at least 15 times the spacing therebetween, said spaces between said surfaces establishing horizontally elongate vapor zones, (6) means for removing vapor formed in said vapor zones between opposite facing surfaces of said sheet members in a substantially horizontal direction, (7) means for imparting to the vapor a change in direction without departing from the horizontal flow direction.

References Cited

UNITED STATES PATENTS

| | | | |
|---|---|---|---|
| 2,514,944 | 7/1950 | Ferris et al. | 202—236 |
| 2,608,387 | 8/1952 | Randall | 202—158UX |
| 2,615,835 | 10/1952 | Dixon | 202—158X |
| 3,366,158 | 1/1968 | Rosenblad | 159—13 |

NORMAN YUDKOFF, Primary Examiner

D. EDWARDS, Assistant Examiner

U.S. Cl. X.R.

203—Dig. 17, 88, 89, 91; 202—236; 159—13